US010239500B2

(12) United States Patent
LaCroix

(10) Patent No.: US 10,239,500 B2
(45) Date of Patent: Mar. 26, 2019

(54) RAIL WHEEL CLEANING SYSTEM

(71) Applicant: Barry LaCroix, North Delta (CA)

(72) Inventor: Barry LaCroix, North Delta (CA)

( * ) Notice: Subject to any disclaimer, the term of this patent is extended or adjusted under 35 U.S.C. 154(b) by 0 days.

(21) Appl. No.: 15/850,566

(22) Filed: Dec. 21, 2017

(65) Prior Publication Data
US 2018/0186343 A1 Jul. 5, 2018

Related U.S. Application Data

(60) Provisional application No. 62/439,935, filed on Dec. 29, 2016.

(51) Int. Cl.
*B60S 3/00* (2006.01)
*B60S 3/04* (2006.01)
*B61K 13/00* (2006.01)

(52) U.S. Cl.
CPC ............... *B60S 3/042* (2013.01); *B60S 3/006* (2013.01); *B61K 13/00* (2013.01)

(58) Field of Classification Search
CPC ........... B60S 3/042; B60S 3/006; B61K 13/00
USPC .................. 246/220, 264, 269, 453
See application file for complete search history.

(56) References Cited

U.S. PATENT DOCUMENTS

| | | | | |
|---|---|---|---|---|
| 2,393,146 A * | 1/1946 | Clark | ........................ | B61K 7/08 188/62 |
| 4,003,451 A * | 1/1977 | Torok | ........................ | B61K 7/04 188/250 B |
| 4,125,177 A * | 11/1978 | Durraffourt | .............. | B61K 7/08 104/26.2 |
| 4,265,401 A * | 5/1981 | Jackson | ..................... | E01B 5/18 238/17 |
| 5,172,123 A * | 12/1992 | Johnson | ................ | G01S 7/4008 331/4 |
| 5,388,525 A * | 2/1995 | Bodkin | ..................... | B61K 7/02 104/252 |
| 5,501,418 A * | 3/1996 | Humphrey | ................. | E01B 7/02 246/453 |
| 5,991,952 A * | 11/1999 | Bintzler | .................. | B60S 3/006 104/307 |
| 6,464,177 B1 * | 10/2002 | Heim | ......................... | E01B 7/02 246/453 |
| 7,306,077 B2 * | 12/2007 | Heyden | ..................... | B61K 7/04 188/62 |

(Continued)

*Primary Examiner* — Jason C Smith
(74) *Attorney, Agent, or Firm* — Ridout & Maybee LLP

(57) ABSTRACT

The present concept is a rail wheel cleaning system which includes a base support plate, an adjusting assembly mounted on the base support plate, a sliding assembly configured to co-operatively engage with the adjusting assembly, and a shoe assembly mounted onto the sliding assembly and configured to be engage-able with the rail wheel at a preselected level for cleaning the rail wheel. Preferably the adjusting assembly includes an adjustment rod which is configured to operably move the sliding assembly in a transverse direction when the rod is moved in a longitudinal direction. Additionally preferably the adjusting assembly includes a wedge with an inclined wedge face, and the adjustment rod includes an inclined rod face configured to slide-ably engage with the wedge face, such that when the rod is urged in a tighter direction the sliding assembly is urged in an outward direction thereby increasing the impingement of the shoe assembly on the rail wheel.

16 Claims, 11 Drawing Sheets

(56) References Cited

U.S. PATENT DOCUMENTS

| | | | |
|---|---|---|---|
| 7,766,283 B2* | 8/2010 | Lesemann | E01B 7/02 246/442 |
| 8,474,730 B2* | 7/2013 | Weaver | E01B 5/18 104/242 |
| 2008/0087773 A1* | 4/2008 | Meyer | E01B 7/02 246/453 |
| 2009/0045297 A1* | 2/2009 | Achleitner | B61L 5/107 246/220 |
| 2018/0186343 A1* | 7/2018 | LaCroix | B60S 3/006 |

* cited by examiner

310

312

314

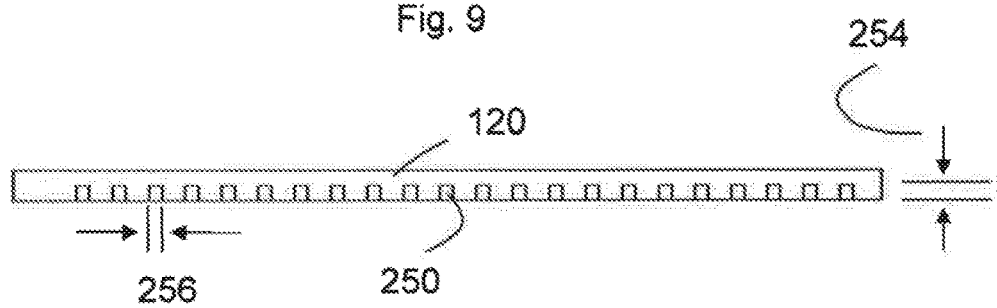
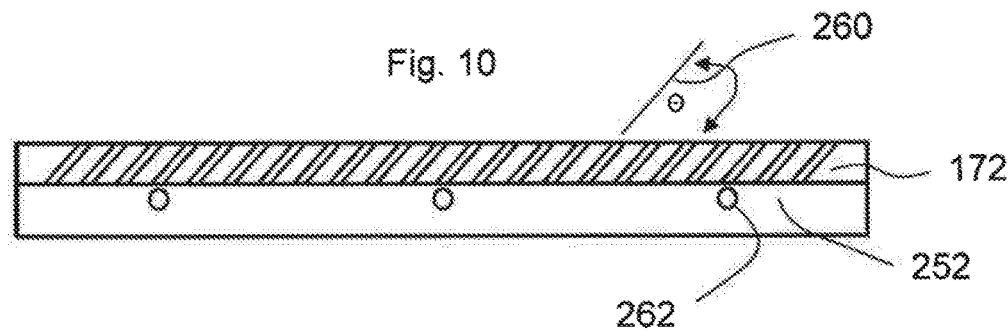
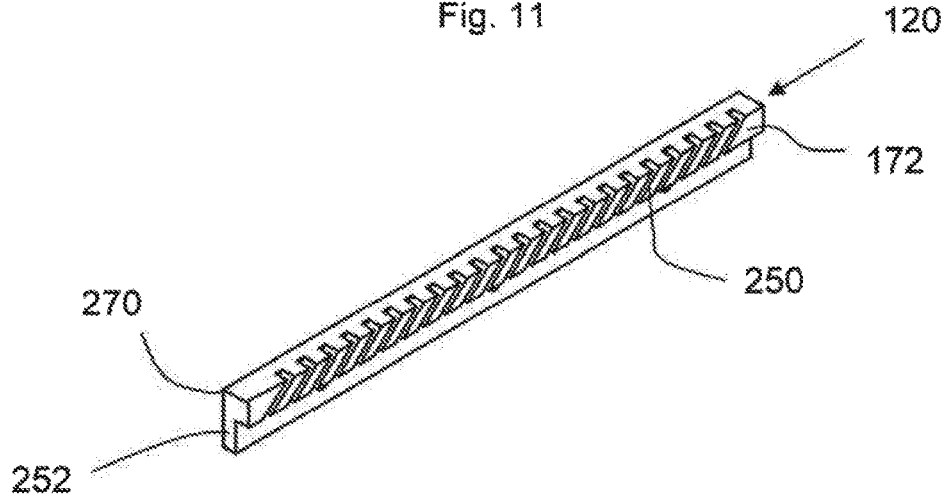
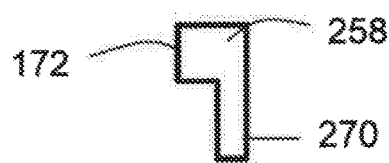

RAIL WHEEL CLEANING SYSTEM

The present application claims priority from previously filed U.S. provisional patent application 62/439,935 filed Dec. 29, 2016 under the title RAIL WHEEL CLEANING SYSTEM by Barry LaCroix.

FIELD OF THE INVENTION

The present concept relates generally to railroad wheel cleaning devices and more specifically to a system for cleaning railroad car wheels in hump yards

BACKGROUND OF THE INVENTION

Railroads have large rail yard centres or humps for arranging rail cars into lines which are linked with one or more engines. At the rail yard humps, individual rail cars or groups of rail cars are disengaged from their current line or engine and are then engaged with new lines and engines. In order to effect the engagement and disengagement of the rail cars, they must be slowed down or retarded substantially from their travel speed in order to ensure safe operation of the yard and to minimize damage in the engaging and disengaging process.

Devices called retarders are used to slow rail cars down in rail yards and normally have devices which engage at the outer and inner face of the wheel rims acting as a break on the wheels to frictionally squeeze the wheels as the cars pass through the retarder. In practice, the rail cars may be slowed from 18 miles an hour to 3 miles per hour as they pass through a typical retarder.

In order for the retarders to work effectively, there must be a minimum amount of friction between the retarder and the rail car wheels in order to function properly. Unfortunately, substances including oils, greases and commodities such as sugar, flour and syrup tend to accumulate on the wheels of rail cars, which tend to reduce the friction between the wheels and the retarder and reduce the effectiveness of the retarder. Grease and dirt on one wheel may carry over on to the retarder mechanisms and thereby contaminate the entire retarder mechanism rendering it inefficient or ineffective. This can result in a dangerous situation where the rail cars are moving far too quickly as they exit the retarder, resulting in damage to rail cars and unsafe operations. Therefore, there is a need to keep the rail wheels as clean as possible, particularly in rail yard humps where they are manipulated. There have been a number of different rail car wheels cleaning systems proposed and used in the past with varying amounts of effectiveness. One such rail car wheel cleaning system is described in U.S. Pat. No. 1,831,802 to Herbert L. Bone titled WHEEL SCRAPING APPARATUS and the like which was issued on Nov. 17, 1931. Another system is described in U.S. Pat. No. 5,991,952 titled RAIL CAR WHEEL CLEANING SYSTEM by inventor Robert R. Bintzler which was issued on Nov. 30, 1999.

All of these wheel car cleaning systems have varying degrees of effectiveness however one major drawback with all of these systems is the very high maintenance cost associated with keeping the cleaning systems effective and the significant amount of time required for adjusting and maintaining the systems to allow them to operate at optimal levels.

There is need for a rail car cleaning system which is simple, requires a minimal amount of maintenance, can be adjusted rapidly without great amounts of labour and manpower requirement, and provides consistent cleaning under a wide variety of operating and weather conditions.

SUMMARY OF INVENTION

The present concept is a rail wheel cleaning system Comprising: a base support plate; an adjusting assembly mounted on the base support plate; a sliding assembly configured to co-operatively engage with the adjusting assembly; a shoe assembly mounted onto the sliding assembly and configured to be engageable with the rail wheel at a preselected level for cleaning the rail wheel;

Preferably wherein the adjusting assembly includes an adjustment rod which is configured to operably move the sliding assembly in a transverse direction when the rod is moved in a longitudinal direction.

Preferably wherein the adjusting assembly includes a wedge with an inclined wedge face, and the adjustment rod includes an inclined rod face configured to slidably engage with the wedge face, such that when the rod is urged in a tighter direction the sliding assembly is urged in an outward direction thereby increasing the impingement of the shoe assembly on the rail wheel.

Preferably wherein the adjusting assembly further includes a stop bracket rigidly mounted to the base support plate preventing the adjustment rod from moving in an inward direction.

Preferably wherein the adjustment rod includes a pin, and the wedge includes a groove for receiving a portion of the pin therein, such that the pin cooperatively slides along the groove thereby ensuring there is constant contact between the rod face and the wedge face.

Preferably wherein the sliding assembly includes a slide bracket slideably received on the base support plate, such that the slide bracket is free to slide across the base support plate.

Preferably wherein the slide bracket further includes a horizontally oriented planar skid plate, and the base support plate further includes guide brackets mounted thereon for receiving the skid plate there between, such that the slide bracket is free to slide across the base support plate in the transverse direction.

Preferably wherein the sliding assembly further includes a vertical spring bracket extending upwardly from the skid plate and a shoe slide support with a horizontally extending planar slide surface rigidly attached to the skid plate and the spring bracket, the slide surface for receiving the shoe assembly thereon.

Preferably wherein the shoe assembly includes a cleaning shoe detachably fastened to a shoe slide such that a worn out cleaning shoe can be replaced by detaching from the shoe slide.

Preferably wherein the shoe slide is slideable supported on the slide surface of the shoe slide support.

Preferably wherein the shoe slide support further includes guide bolts, and the slide surface includes a recess for receiving the guide bolts slideably along the recess, such that the recess and guide bolts for guiding the shoe slide in the transverse direction.

Preferably wherein the shoe assembly further includes a spring bolt and a spring for compressing the spring between the shoe slide and the spring bracket thereby pre-compressing the spring to the preselected level such that a preselected amount of pressure is impinged on the wheel when the wheel deflects the cleaning shoe.

Preferably wherein the shoe assembly includes a cleaning shoe with a contact face engageable with the rail wheel which includes numerous spaced apart grooves oriented at a preselected angle theta relative to the horizontal.

Preferably wherein theta is preferably between 5 and 85 degrees.

Preferably wherein theta is preferably between 25 and 65 degrees.

Preferably wherein the cleaning shoe is L shaped and is fastened to a shoe slide such that a worn out cleaning shoe can be replaced by detaching from the shoe slide.

Preferably wherein multiple sliding assemblies and shoe assemblies can be arranged side by side in spaced apart fashion along a longitudinal direction and connected to a common adjustment rod such that multiple shoe assemblies can be set to a preselected level of engagement with the rail wheel.

BRIEF DESCRIPTION OF THE DRAWINGS

The present concept will now be described by way of example only with reference to the following drawings in which:

FIG. 9 is a top plan view of the cleaning shoe.

FIG. 10 is a side elevation view of the cleaning shoe.

FIG. 11 is a schematic top perspective view of the cleaning shoe.

FIG. 12 is a schematic cross sectional view of the cleaning shoe.

DETAILED DESCRIPTION OF THE PREFERRED EMBODIMENTS

Figure 1:
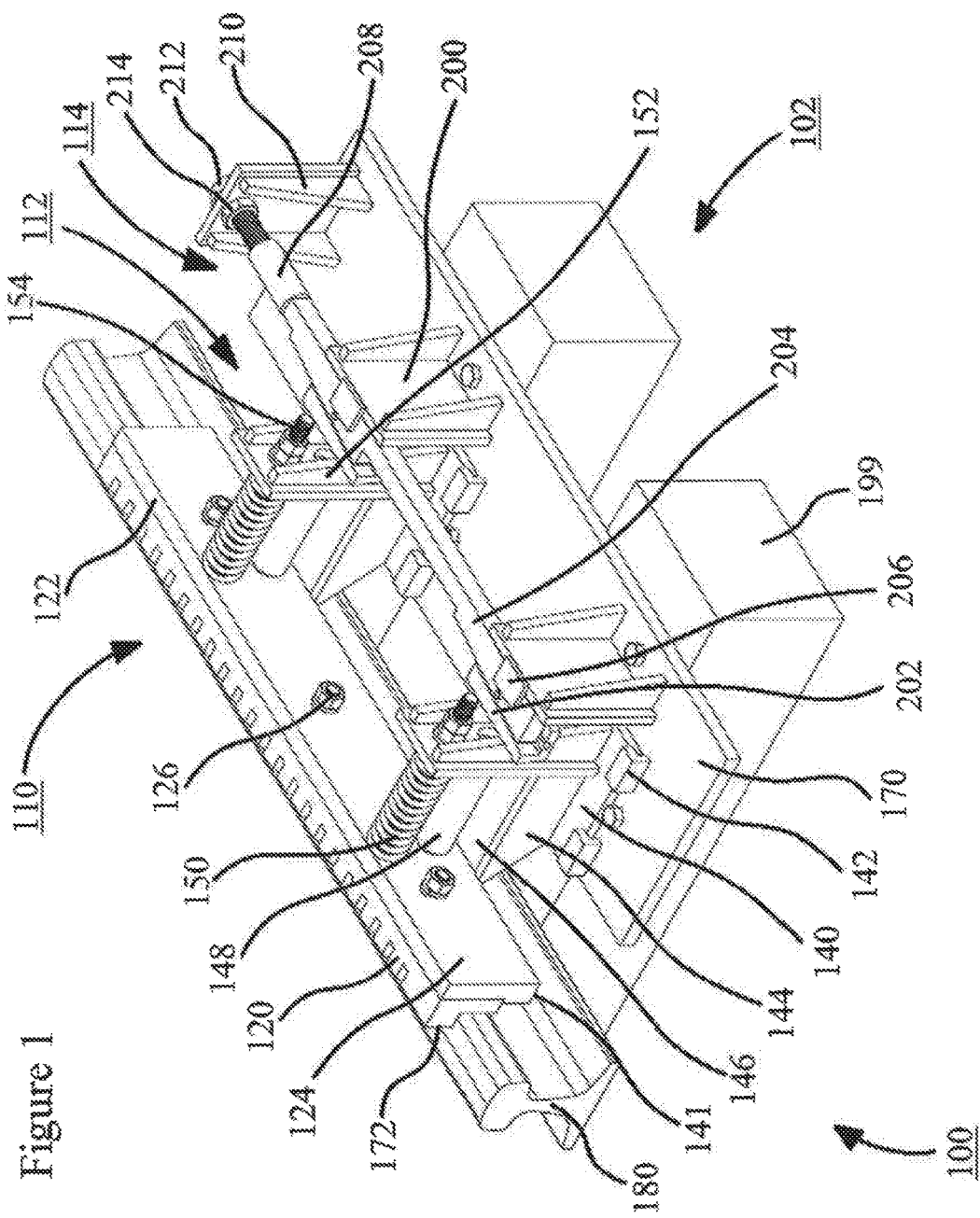
FIG. 1 is a schematic perspective view of a cleaning module that includes a shoe assembly mounted to two sliding assemblies which are connected to an adjusting assembly, all of which is mounted on to a base
Figure 2:
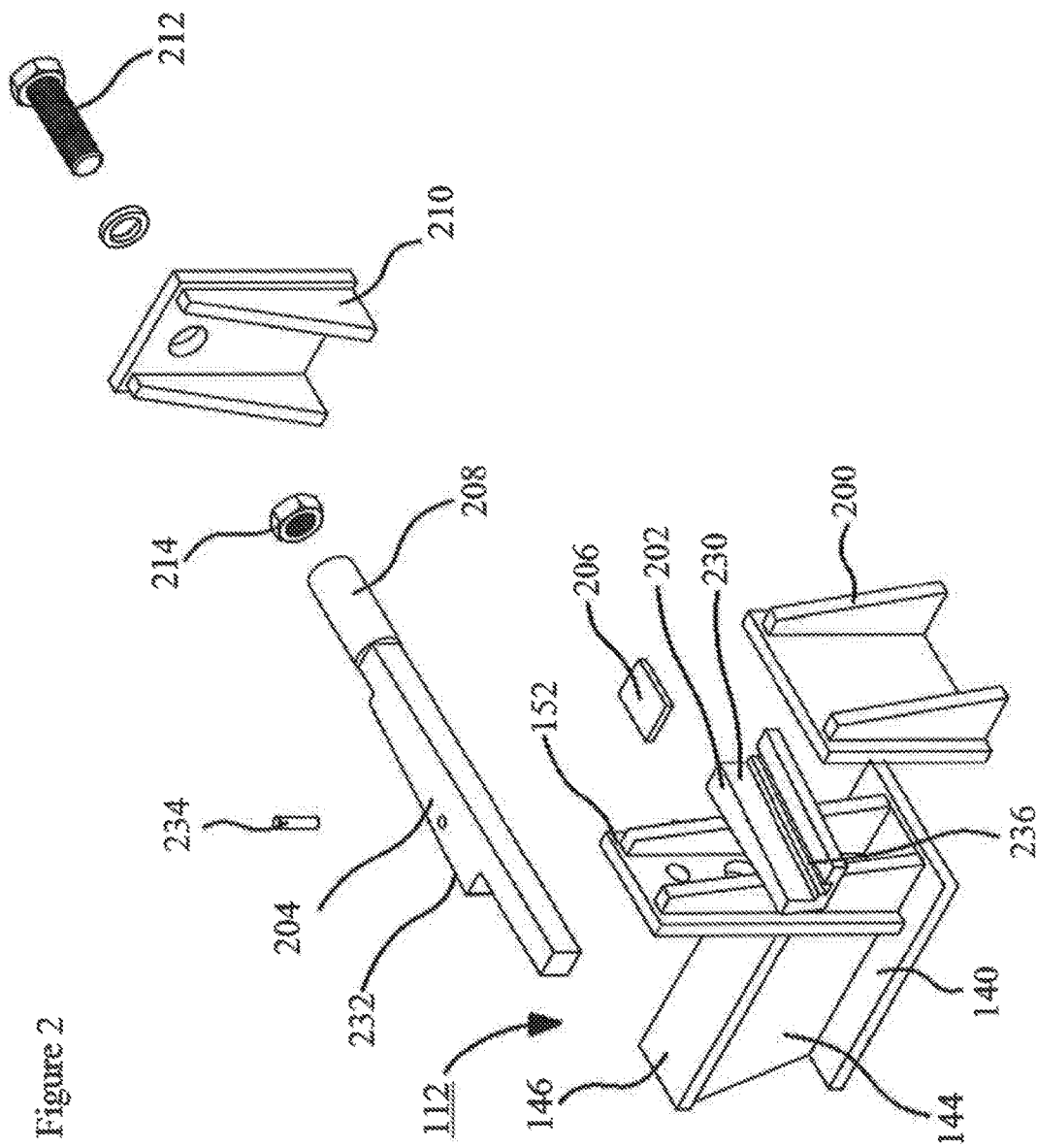
FIG. 2 is a schematic perspective exploded view of the sliding assembly together with a portion of the adjusting assembly.

The present concept of rail wheel cleaning system, shown generally as 100, is depicted in FIG. 1, which is a single module 102 incorporating one cleaning shoe 120 and shoe slide 122 for the rail wheel cleaning system 100. The module depicted in FIG. 1 can be connected in tandem to other identical modules 102 creating a rail wheel cleaning system 100 of a selected length depending on the amount of cleaning and/or the amount of room that a particular hump yard might have to install the cleaning system.

Figure 13:
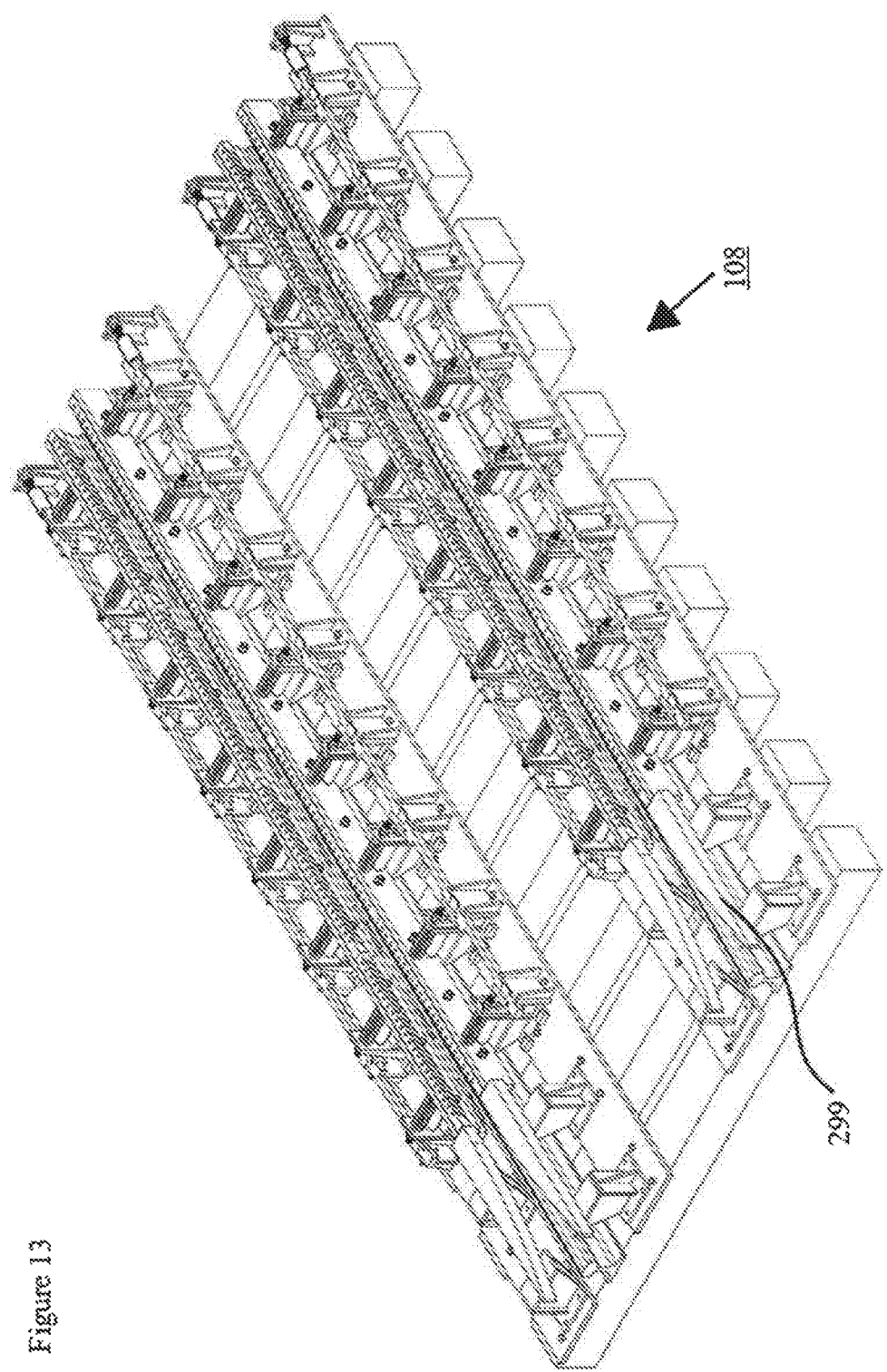
FIG. 13 is a top perspective schematic view of the cleaning system deployed on to a section of rail with multiple cleaning shoes and sliding assemblies.

FIG. 13 depicts an installation which incorporates a number of cleaning modules 102 depicted in FIG. 1, including entry guides 299 for rail wheels entering the cleaning station. The reader will understand that the cleaning module 102 depicted in FIG. 1, which when attached in tandem, will become part of the rail wheel cleaning system 100. Cleaning module 102 will also be installed on either side of a wheel as shown in FIG. 13. In other words, a mirror image of the cleaning module 102 depicted in FIG. 1, is installed on the other side of the rail wheel in order that the cleaning shoes 120 would impinge both on the outer rim face 174 as well as the inner rim face 182 of the wheel.

The major components of the cleaning module 102 of the rail wheel cleaning system 100 depicted in FIG. 1 are as follows, namely shoe assembly 110, sliding assembly 112, and adjusting assembly 114. Shoe assembly 110 includes a cleaning shoe 120, a shoe slide 122 having a back face 124 and fastening bolts 126. Fastening bolts 126 rigidly connect cleaning shoe 120 with shoe slide 122.

Sliding assembly 112 includes the following major components, namely sliding plate 140, plate brackets 142, support 144, slide face 146, guide tubes 148, spring 150, spring bracket 152, compression bolt 154, locking nuts 156. Guide tubes 148 include an outer guide tube 158 and an inner guide tube 160.

Figure 3:
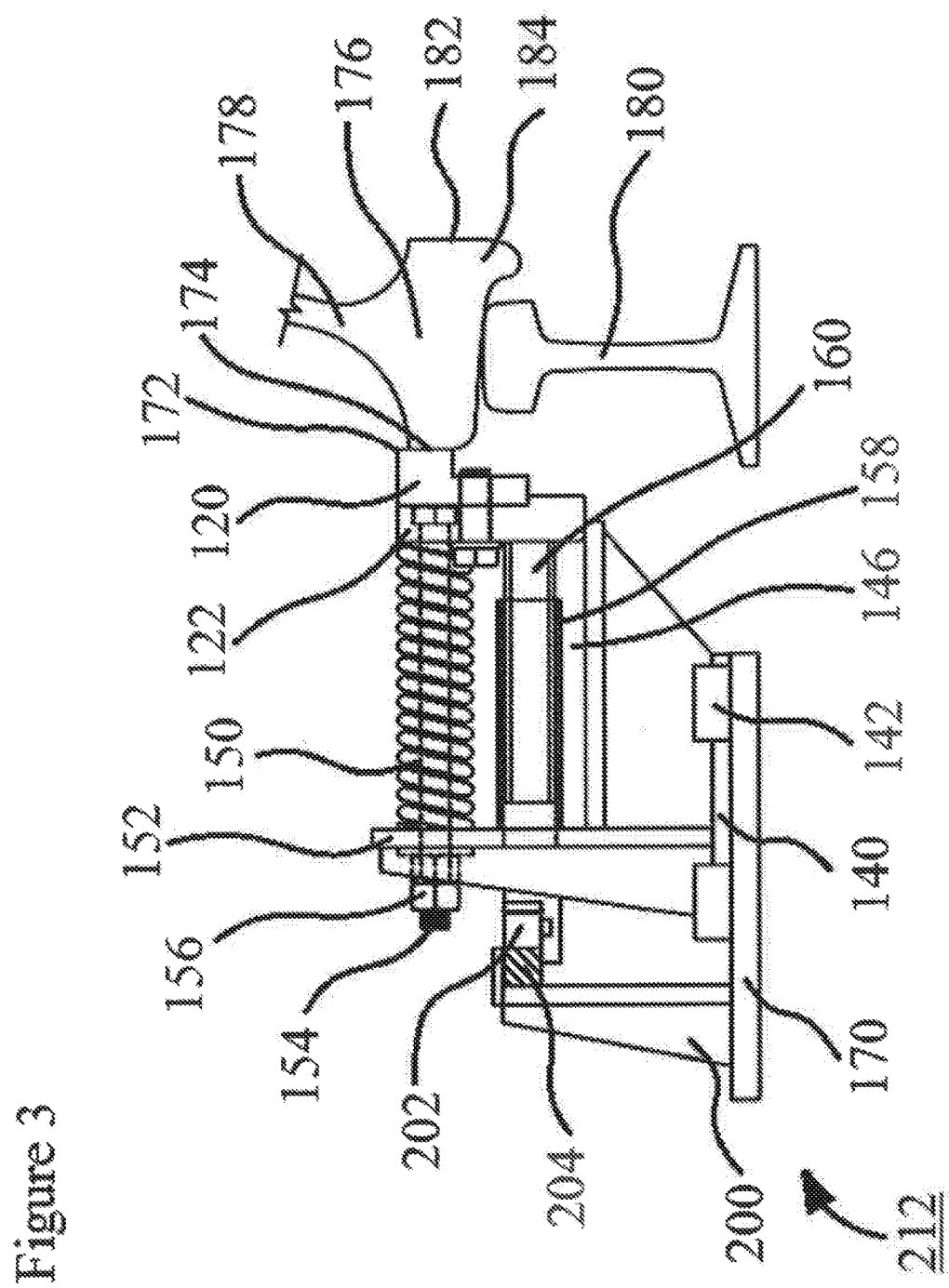
FIG. 3 is a schematic side elevation partial cross sectional view of the cleaning system including the shoe assembly, the sliding assembly, and the adjusting assembly deployed on to a rail wheel which is mounted on to a rail.

Referring now to FIG. 3, sliding assembly 112 slides along the surface of a base 170. Cleaning shoe 120 includes a contact face 172 which makes contact with outer rim face 174 of wheel rim 176 of wheel 178.

FIG. 3 depicts a rail 180 on which wheel 178 is positioned in the rolling position. Wheel 178 includes an inner rim face 182 and a wheel flange 184. Referring now to FIG. 1 and FIG. 3, adjusting assembly 114 includes stop brackets 200, wedges 202, adjustment rod 204, rod retainers 206, threaded coupling 208, adjustment bracket 210, adjusting bolt 212, and lock nut 214.

Adjusting assembly 114 further includes a wedge face 230, a co-operating rod face 232, a guide pin 234, and a pin groove 236.

The reader will understand that the length of adjustment rod 204 will depend on the number of cleaning modules 102 which are mounted in tandem in order to create a cleaning station 108 as shown in FIG. 13.

Figure 4:
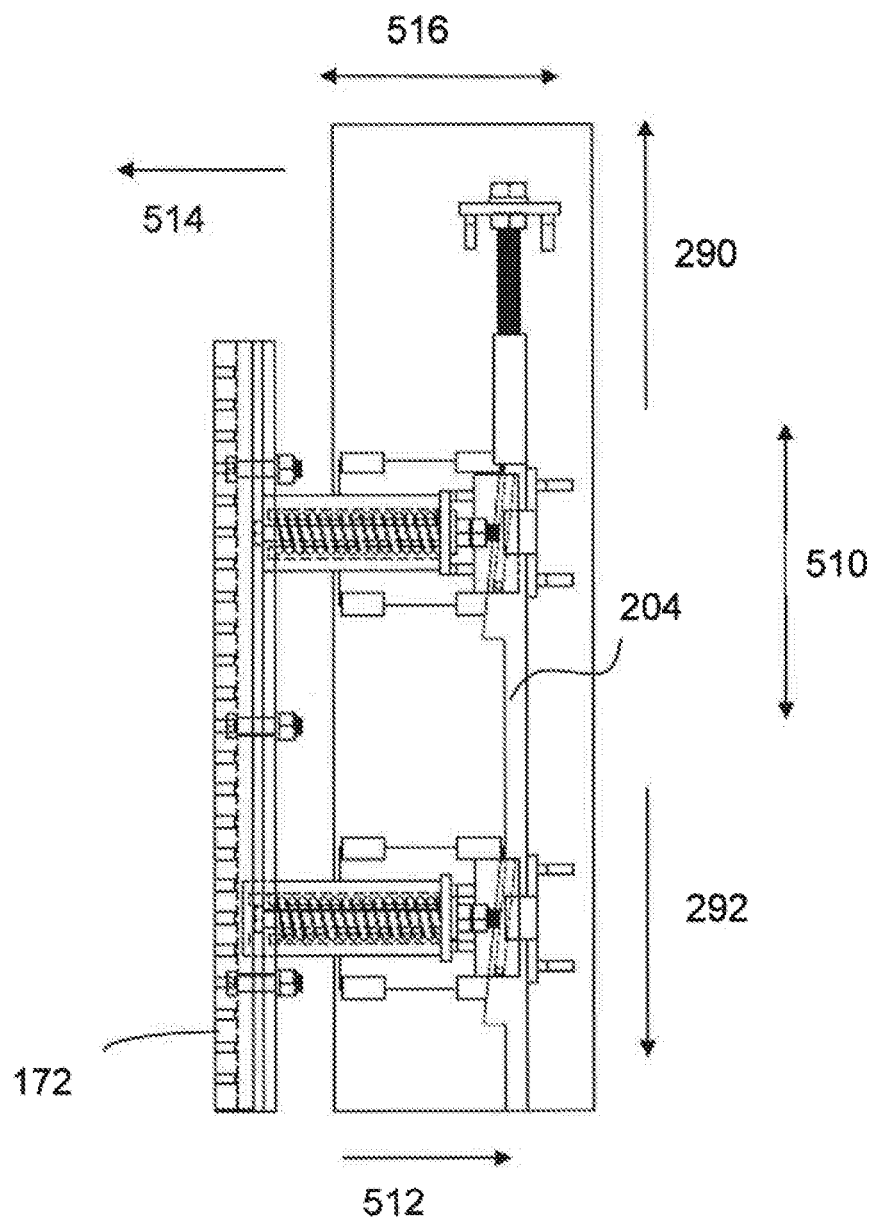
FIG. 4 is a top plan view of the cleaning system shown in perspective view in FIG. 1.

FIG. 4 depicts a cleaning module 102 which is depicted in FIG. 1 from a top plan perspective schematic view.

Figure 5:
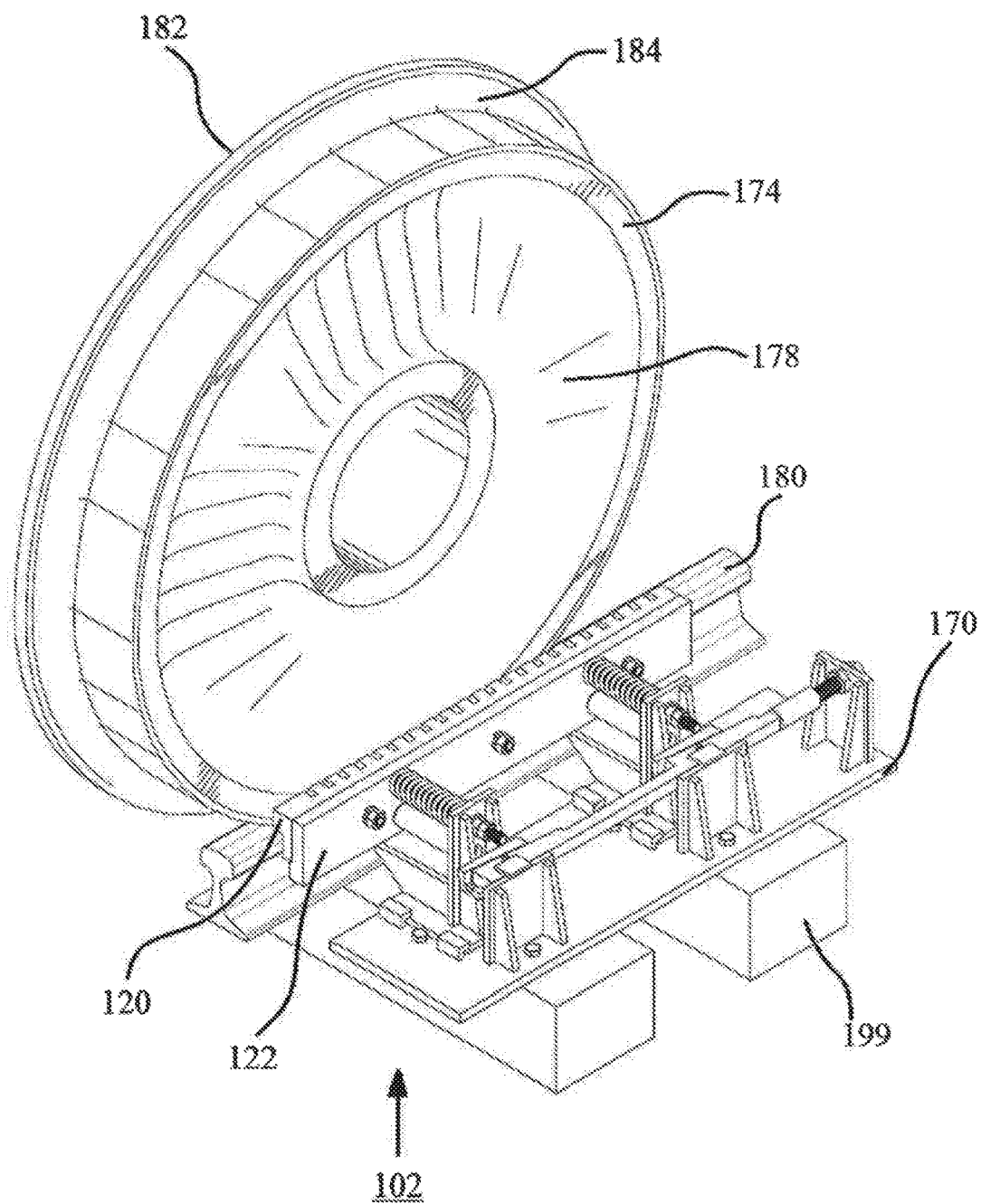
FIG. 5 is a schematic perspective view of the cleaning system shown in FIG. 1 deployed on to a rail wheel, which is mounted on to a rail.

FIG. 5 shows a cleaning module 102 deployed together with a wheel 178 mounted on a rail 180, wherein the outer rim face 174 is being scraped by the cleaning shoe 120 as it rolls through cleaning module 102 depicted in FIG. 5.

Referring now to FIGS. 9 through 12, which depicts the details of the cleaning shoe 120.

Cleaning shoe 120 includes a contact face 172, angularly oriented grooves 250, having a groove width 256 and a groove depth 254, a back portion 252 wherein the groove angle relative to the horizontal is depicted as theta 260. Holes 262 receive fastening bolts 126 there through for fastening cleaning shoe 120 to shoe slide 122 as depicted in FIG. 1 and FIG. 3.

Preferably angle theta, which is the angle the groove makes in relationship to the horizontal, is 45 degrees, however in practice an angle theta of anywhere between 20 to 80 degrees would work in this arrangement.

In profile, cleaning shoe 120 has an L shape profile 258 as shown in FIG. 12 wherein the rear side 270 abuts with the shoe slide 122.

Preferably, the grooves have a depth of approximately ½ to 1 inch and have a width of anywhere from ¼ inch to ¾ of an inch. Preferably the groove depth 254 is approximately ⅞ of an inch and preferably the groove width 256 is ½ inch.

Alternate Embodiment

Figure 14:
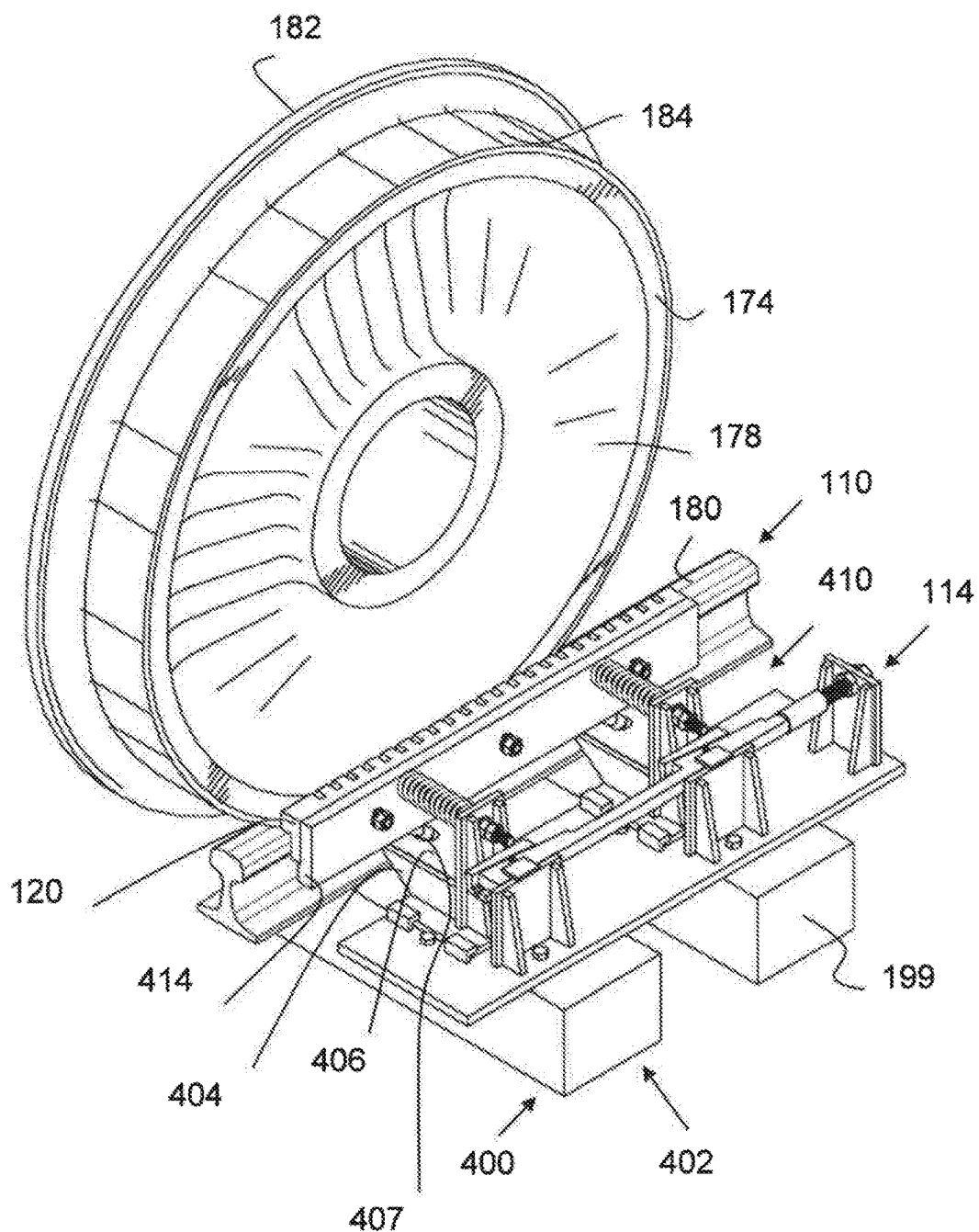
FIG. 14 is a schematic perspective view of an alternate embodiment of the rail wheel cleaning system deployed onto a rail wheel which is mounted onto the rail.
Figure 15:
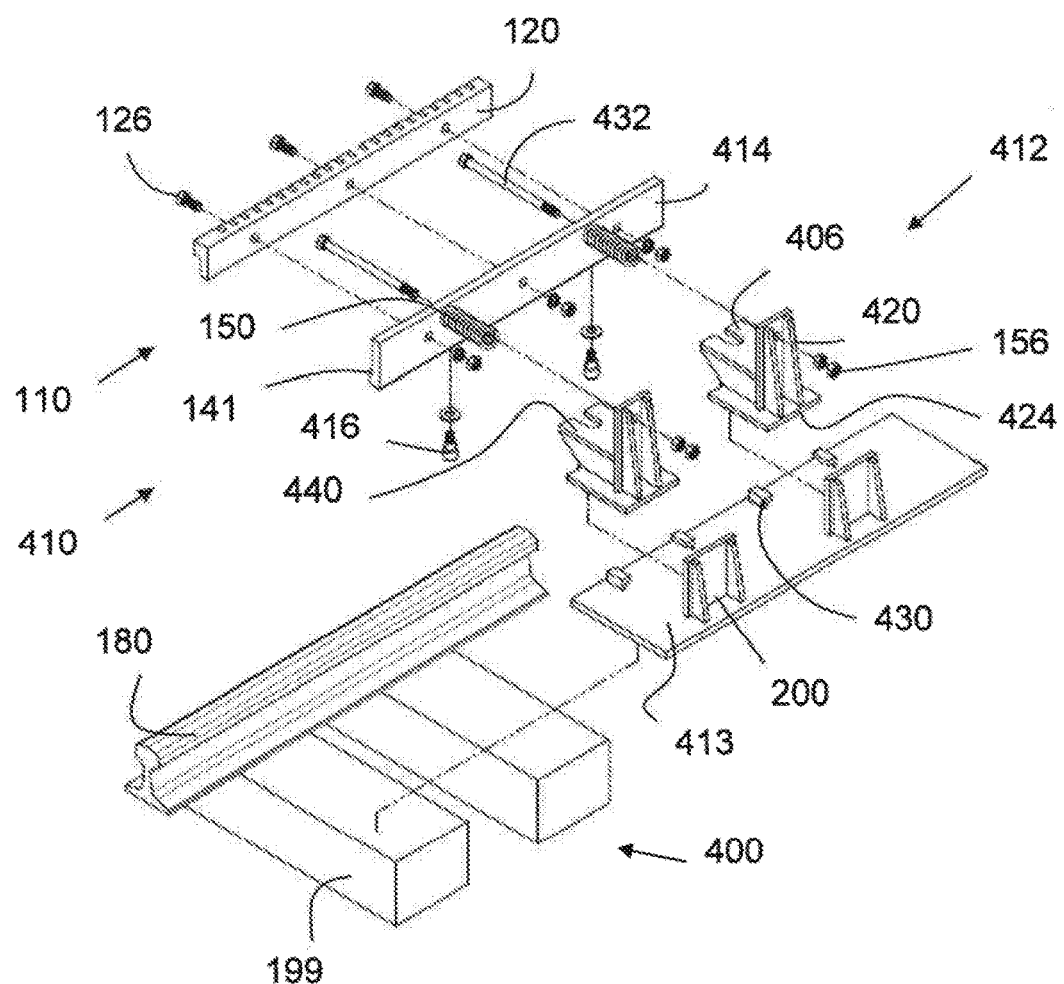
FIG. 15 is a schematic exploded assembly view of the rail wheel cleaning system shown in FIG. 14.
Figure 16:
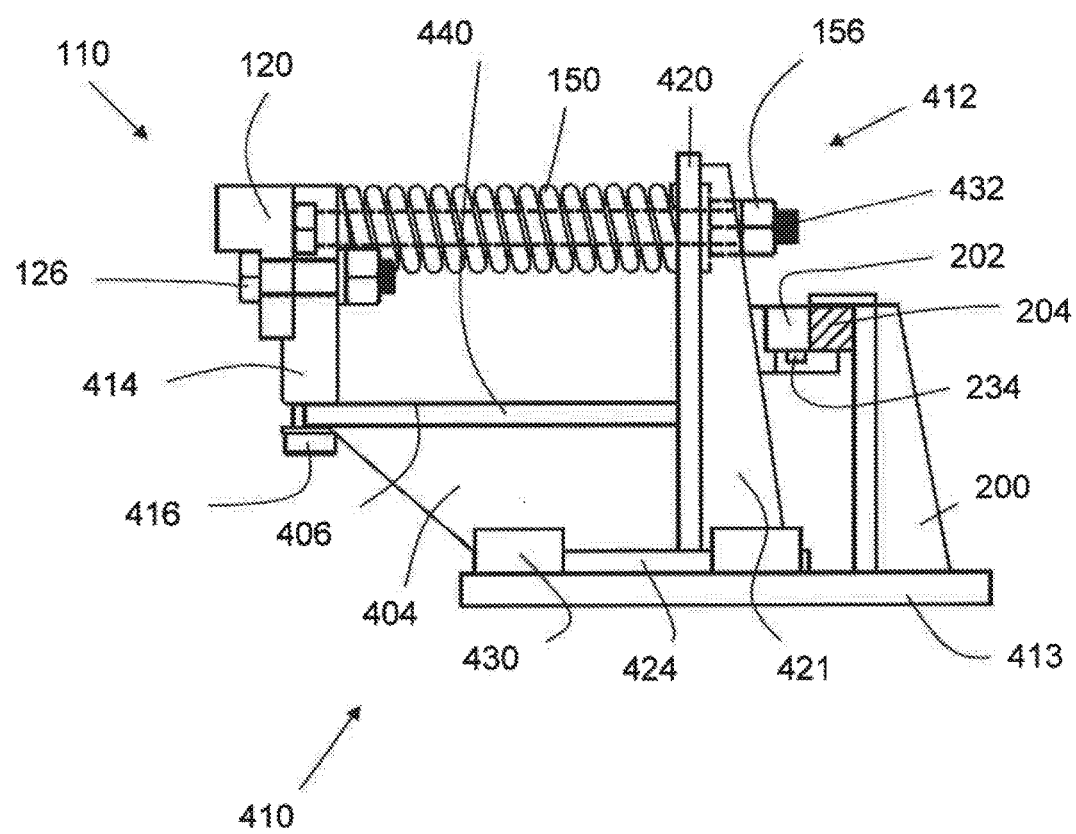
FIG. 16 is a schematic side of the elevation partial cross sectional view of the cleaning system including the shoe assembly, the sliding assembly, and the adjusting assembly as depicted in FIG. 14.

Referring now to FIGS. 14, 15 and 16 which show an alternate embodiment, namely a rail wheel cleaning system shown generally as 400 which includes the following major components namely, shoe assembly 110 which is the same and carried over from the previous embodiment, sliding assembly 410 which has been modified from the previous sliding assembly 112 and adjusting assembly 114 which is the same as and carried over from the previous adjusting assembly 114, and includes stop brackets 200.

Shoe assembly 110 includes cleaning shoe 120 and shoe slide 414 which is slightly modified from the previous shoe slide 122 in that it now also includes apertures for guide bolts 416, which are shown in FIG. 15. Otherwise, shoe assembly 110 is the same as the previous shoe assembly.

Referring now to FIGS. 14, 15 and 16 shoe assembly 110 includes the following major components namely, slide bracket 412 which includes a spring bracket 420, skid plate 424, support side plates 404 and support plate 440 having a slide surface 406. The reader will note that support plate for 440 also includes a recess 407 for receiving guide bolt 416 there through. Spring bracket 420 includes spring bracket reinforcement 421.

Cleaning shoe 120 is bolted on to shoe slide 414 using fastening bolts 126.

Shoe assembly is attached to the sliding assembly 410 using spring bolts 432 which are received through shoe slide 414 and thereafter through springs 150 and through spring brackets 420 and held in place with lock nuts 156. Shoe slide 414 rests slide ably on slide surface 406 of support plate 440 on the slide face 141 of shoe slide 414.

By tightening locknuts 156 of spring bolt 432 one can pretension the amount of tension on spring 150 such that a preselected amount of force is applied to cleaning shoe 120 when it is deflected by wheel 178 as it rolls along rail 180. This is because there is a certain amount of interference 294 as illustrated in FIG. 4 and as described above. FIG. 14 depicts a cleaning module 402 which includes two sliding assemblies 410 which mount onto a single shoe assembly 110 and a single adjusting assembly 114. Skid plate 424 of slide bracket 412 is slid-ably received onto a base support plate 413 and through guide brackets 430 such that the movement of slide bracket 412 is limited to the transverse direction 516 shown in FIG. 4. Guide bolt 416 is slide ably received within recess 407 defined in support plate 440 which allows the shoe assembly 110 to move in the transverse direction 516. Base support plate 413 is mounted onto rail ties 199.

Adjusting assembly 114 is identical to the previous adjusting assembly 114 and includes stop bracket 200, guide pin 234, adjustment rod 204, wedge 202, as well as the other components depicted in FIGS. 1-13 and described above.

Stop bracket 200 prevents the movement of adjustment rod 204 in the inward direction 512 as shown in FIG. 4 and by using adjusting bolt 212 and locknut 214 one is able to move the adjustment rod 204 along the longitudinal direction 510 either in the tighter direction 290 or the looser direction 292. The reader will note that the major difference between the embodiment shown in FIGS. 1-13 and that shown in FIGS. 14, 15 and 16 is the elimination of guide tubes 148, namely outer guide tubes 158 and inner guide tube 160 has been eliminated.

In its place a guide bolt 416 is bolted into the bottom slide face 141 of shoe slide 414 and slide ably received a recess 407 of support plate 440.

In order to select the proper of pretension on springs 150 which ultimately determine the amount of force that is applied by cleaning shoes 120 on to wheel 178 given a certain amount of interference or deflection of the shoe assembly 110.

In order to adjust the amount of pretension the locknuts 156 are tighten or loosened until the proper amount of pretension is applied to springs 150. During this pretensioning the shoe slide 414 slides along the slide surface 406 of slide bracket 412. When wheel 178 impinges onto the contact face 172 of cleaning shoe 120 the outer rim face 174 makes contact with contact face 172 and deflects shoe assembly 110 in the inward direction 512 such that shoes slide 414 slides along slide surface 406.

In order to adjust the amount of interference 294 the adjustment rod 204 is moved along the longitudinal direction using adjustment bolt 212 and locking nut 214 thereby moving skid plate 424 and the entire slide bracket 412 along the top surface of base support plate 413 and within guide brackets 430 until the amount of preselected interference 294 is achieved.

Figure 6:
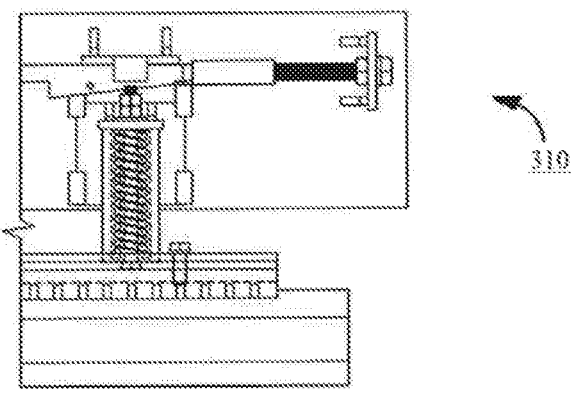
FIG. 6 is a top schematic plan view of a portion of the cleaning system showing the cleaning shoe in a no worn position.
Figure 7:
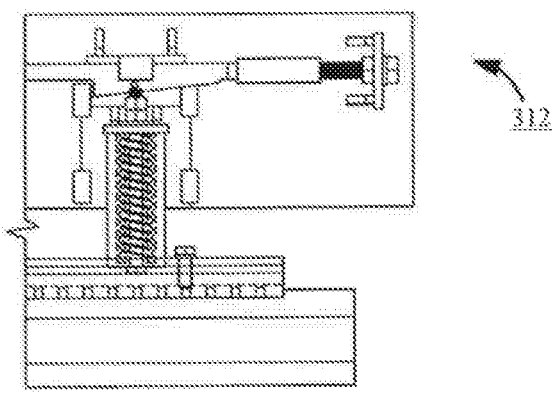
FIG. 7 is a top schematic plan view of a portion of the cleaning system showing the cleaning shoe in a partially worn position.
Figure 8:
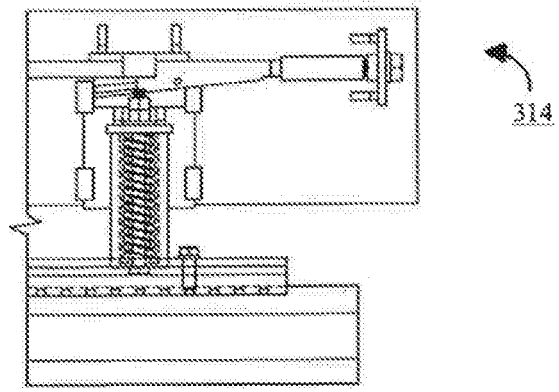
FIG. 8 is a top schematic plan view of a portion of the cleaning system showing the cleaning shoe in a worn out position.

The amount of interference 294 must be adjusted from time to time due to the wear of the cleaning shoes 120 as depicted in FIGS. 6, 7 and 8. The use of this embodiment is identified to the above embodiment except where differences have been noted above. Use of this embodiment is similar to that of the device as described below, except as noted above.

In Use

The rail wheel cleaning system 100 as depicted in the FIGS. 1 through 13 is put in use as follows.

Shoe assembly 110 is mounted on to sliding assembly 112 using the compression bolt 154 which essentially compresses spring 150 between the shoe slide 122 and the spring bracket 152, thereby preloading spring 150.

Outer guide tube 158 is preferably mounted to spring bracket 152 and inner guide tube 160 is preferably mounted to the back of shoe slide 122 such that when locking nuts 156 are tightened, slide face 141 of shoe slide 122 slides across slide surface 146 and inner guide tube 160 is telescopically received within outer guide tube 158 as the shoe slide 122 is brought closer to spring bracket 152.

Sliding assembly 112 has a sliding plate 140 which slides along base 170. Adjusting assembly 114 prevents sliding assembly 112 from moving away from wheel 178 as the contact face 172 of cleaning shoe 120 makes contact with outer rim face 174. In practice, approximately ⅛ inch of interference 294 between the outer rim face 174 of wheel 178 and the contact face 172 of cleaning shoe 120 is set up such that as the wheel enters the cleaning module 102 it compresses springs 150 by approximately ⅛ of an inch. Since sliding assembly 112 is rigidly held in place by the adjusting assembly 114, sliding assembly 112 is prevented from moving away from wheel 178. In other words, shoe assembly 110 moves ⅛ inch away from outer rim face 174 as wheel 178 enters cleaning module 102.

Springs 150 are selected such that ⅛ inch of interference between outer rim face 174 and contact face 172 creates approximately 500 to 1000 lbs of force per shoe at the interface between the shoe and the wheel rim. The locking nuts 156 of compression bolt 154 are normally setup at the initial installation of the cleaning module 102 to create enough compression for spring 150 to achieve the desired force on the cleaning shoe 120 when approximately ⅛ inch of interference exists between the wheel 178 and the cleaning shoe 120. In practice the interface can range from ¼ inch to ¹⁄₃₂ inch.

Adjusting mechanism 114 using adjusting bolt 112 adjusts or sets the amount of interference 294 between outer rim face 174 and contact face 172. By urging adjustment rod 204 in the tighter direction shown as 290 in FIG. 4, one is able to increase the amount of interference 294 between the contact face 172 and the outer rim face 174. Once the interface interference 294 falls below ¹⁄₁₆ inch, adjustment is recommended.

On the other hand, by moving adjustment rod 204 in the looser direction 292, one is able to decrease the amount of interference 294 between the contact face 172 of cleaning shoe 120 and the outer rim face 174 of wheel 178. It is also possible to completely eliminate any interference 294.

The reader will also note that rather than using adjusting bolt 212, locking nut 214 and adjustment bracket 210, it is possible to use a linear actuator to move adjustment rod 204 in both the tighter direction 290 and the looser direction 292 in order to effect adjusting.

It may also be possible to have adjustment bracket 210 slideably attached to the base 170 wherein linear actuator would then move the entire adjustment bracket 210 together with adjusting bolt 212, and lock nut 214 in either the tighter direction or the looser direction in order to effect adjusting and motion of adjustment rod 204.

The reader will also note that it is the wedge shape rod face 232 and the co-operating wedge face 230 of wedge 202 which moves the adjusting assembly 114 either towards rail 180 or away from rail 180, which in turn would either move the entire assembly towards wheel rim 176 or away from wheel rim 176.

FIGS. 6, 7 and 8 show the progression of the wear of cleaning shoe 120 wherein FIG. 6, the contact face 172 of cleaning shoe 120 has not worn and is in the as new installed position, namely, no wear position 310.

FIG. 7 shows that the contact face 172 has worn somewhat and now the assembly is in the partially worn position 312.

FIG. 8 shows the contact face 172 in the almost end of life, or the worn out position 314 wherein the maximum amount of adjustment available with adjustment rod 204 has been achieved and therefore now it is necessary to replace cleaning shoe 120 by removing it from shoe slide 122 and fastening a new cleaning shoe 120 to shoe slide 122.

It should be apparent to persons skilled in the arts that various modifications and adaptation of this structure described above are possible without departure from the spirit of the invention the scope of which defined in the appended claim.

I claim:

1. A rail wheel cleaning system Comprising:
   a) a base support plate;
   b) an adjusting assembly mounted on the base support plate, the adjusting assembly including an adjustment rod and a stop bracket rigidly mounted to the base support plate for preventing the adjustment rod from moving in an inward direction;
   c) a sliding assembly configured to co-operatively engage with the adjusting assembly;
   d) a shoe assembly mounted onto the sliding assembly and configured to be engageable with the rail wheel at a preselected level for cleaning the rail wheel.

2. The rail wheel cleaning system claimed in claim 1 wherein the adjustment rod is configured to operably move the sliding assembly in a transverse direction when the rod is moved in a longitudinal direction.

3. The rail wheel cleaning system claimed in claim 2 wherein the adjusting assembly includes a wedge with an inclined wedge face, and the adjustment rod includes an inclined rod face configured to slidably engage with the wedge face, such that when the rod is urged in a tighter direction the sliding assembly is urged in an outward direction thereby increasing the impingement of the shoe assembly on the rail wheel.

4. The rail wheel cleaning system claimed in claim 3 wherein the adjustment rod includes a pin, and the wedge includes a groove for receiving a portion of the pin therein, such that the pin cooperatively slides along the groove thereby ensuring there is constant contact between the rod face and the wedge face.

5. The rail wheel cleaning system claimed in claim 2 wherein multiple sliding assemblies and shoe assemblies can be arranged side by side in spaced apart fashion along a longitudinal direction and connected to a common adjustment rod such that multiple shoe assemblies can be set to a preselected level of engagement with the rail wheel.

6. The rail wheel cleaning system claimed in claim 1 wherein the sliding assembly includes a slide bracket slideably received on the base support plate, such that the slide bracket is free to slide across the base support plate.

7. The rail wheel cleaning system claimed in claim 6 wherein the slide bracket further includes a horizontally oriented planar skid plate, and the base support plate further includes guide brackets mounted thereon for receiving the skid plate there between, such that the slide bracket is free to slide across the base support plate in the transverse direction.

8. The rail wheel cleaning system claimed in claim 7 wherein the sliding assembly further includes a vertical spring bracket extending upwardly from the skid plate and a shoe slide support with a horizontally extending planar slide surface rigidly attached to the skid plate and the spring bracket, the slide surface for receiving the shoe assembly thereon.

9. The rail wheel cleaning system claimed in claim 8 wherein the shoe assembly includes a cleaning shoe detachably fastened to a shoe slide such that a worn out cleaning shoe can be replaced by detaching from the shoe slide.

10. The rail wheel cleaning system claimed in claim 9 wherein the shoe slide is slideable supported on the slide surface of the shoe slide support.

11. The rail wheel cleaning system claimed in claim 10 wherein the shoe slide support further includes guide bolts, and the slide surface includes a recess for receiving the guide bolts slideably along the recess, such that the recess and guide bolts for guiding the shoe slide in the transverse direction.

12. The rail wheel cleaning system claimed in claim 11 wherein the shoe assembly further includes a spring bolt and a spring for compressing the spring between the shoe slide and the spring bracket thereby pre-compressing the spring to the preselected level such that a preselected amount of pressure is impinged on the wheel when the wheel deflects the cleaning shoe.

13. The rail wheel cleaning system claimed in claim 1 wherein the shoe assembly includes a cleaning shoe with a contact face engageable with the rail wheel which includes numerous spaced apart grooves oriented at a preselected angle theta relative to the horizontal.

14. The rail wheel cleaning system claimed in claim 13 wherein theta is preferably between 5 and 85 degrees.

15. The rail wheel cleaning system claimed in claim 13 wherein theta is preferably between 25 and 65 degrees.

16. The rail wheel cleaning system claimed in claim 13 wherein the cleaning shoe is L shaped and is fastened to a shoe slide such that a worn out cleaning shoe can be replaced by detaching from the shoe slide.

* * * * *